United States Patent [19]

Magne

[11] Patent Number: 5,662,839

[45] Date of Patent: Sep. 2, 1997

[54] METHOD OF FILLING A MOLD FOR MANUFACTURING AN OPTICAL LENS

[75] Inventor: Jean-Francois Magne, Creteil, France

[73] Assignee: Essilor International Compagnie Generale d'Optique, Charenton Cedex, France

[21] Appl. No.: 370,972

[22] Filed: Jan. 10, 1995

[30] Foreign Application Priority Data

Dec. 12, 1994 [FR] France ................................. 94 14926

[51] Int. Cl.$^6$ .................................................. B29D 11/00
[52] U.S. Cl. ........................................... 264/1.38; 425/808
[58] Field of Search ................................. 264/1.32, 1.36, 264/1.38, 2.2; 425/808

[56] References Cited

U.S. PATENT DOCUMENTS 2,542,386  2/1951  Beattie .
3,938,775  2/1976  Sarofeen .
4,257,988  3/1981  Matos et al. .
5,110,514  5/1992  Soane .

FOREIGN PATENT DOCUMENTS 2082107  3/1982  United Kingdom .

*Primary Examiner*—Mathieu D. Vargot
*Attorney, Agent, or Firm*—Young & Thomspon

[57] ABSTRACT

A mold for making an optical lens and formed of two molding shells disposed on edge and an annular closure member around their periphery and defining with them a molding cavity. To fill the mold a molding material is introduced into the molding cavity through a casting opening formed for this purpose in the closure member. The casting opening is in the lower part of the molding cavity.

10 Claims, 1 Drawing Sheet

METHOD OF FILLING A MOLD FOR MANUFACTURING AN OPTICAL LENS

BACKGROUND OF THE INVENTION

1. Field of the Invention

The present invention concerns molding optical lenses, especially, but not exclusively, ophthalmic lenses, from a polymerizable synthetic material.

2. Description of the Prior Art

The traditional mold comprises two molding shells at the periphery of which is disposed an annular closure member defining with them the required molding cavity.

If the two molding shells are made of glass and have substantially parallel surfaces, for example, the closure member is a seal in which the molding shells are nested or a sleeve which surrounds them.

If, as described in U.S. Pat. No. 5,110,514, for example, the molding shells are more or less massive, the closure member can be at least in part in one piece with one or both molding shells.

The conventional way to fill a mold made up in this way of two molding shells and a closure member is by causing the molding material to flow into the molding cavity through a casting opening provided for this purpose in the closure member. This opening is at the periphery of the molding shells so as not to interfere with the optically active area of the optical lens formed.

In a manual process the molding shells can be more or less flat, i.e. substantially horizontal, when the material is cast.

In an at least partly automated process, in which the mold to be filled is vertically aligned with a filler device adapted to deliver a particular quantity of molding material through a nozzle, the molding shells are disposed on edge, i.e. substantially vertically, and this is also the case, for specific reasons, in the U.S. Pat. No. 5,110,514 already referred to.

When the molding shells are disposed on edge in this manner, the mold is filled from the top by gravity only.

Experience shows that unless special measures are implemented, for example a relatively long waiting time (in the order of two hours, for example) between filling the mold and starting polymerization, the optical lenses obtained frequently have localized optical defects of greater or lesser severity, leading to relatively high reject rates.

The present invention is based on the surprising observation that these optical defects can largely be avoided if the mold is filled from the bottom, this going against the process which otherwise seems the most natural in that it benefits from the effect of gravity.

The explanation may lie in the fact that, with filling from the top, the "syrup" effect well known to glassmakers is inevitably operative, at least to some degree: given its viscosity, the molding material flows slowly, in "runs", into the molding cavity and there is no close control over this process; also, the molding material is a mixture of constituents which can have different refractive indices and/or coefficients of viscosity, so that stretching or shearing can cause relatively large local index gradients which inevitably produce the optical defects noted if polymerization occurs too soon after filling.

A long waiting time between filling and starting polymerization is then required for good homogenization of the material, in order to avoid optical defects.

SUMMARY OF THE INVENTION

The present invention consists in a method of filling a mold for making an optical lens and formed of two molding shells disposed on edge and at the periphery of which is disposed an annular closure member defining with them a molding cavity, in which method a molding material is introduced into said molding cavity through a casting opening formed to this end in said closure member, said casting opening being in the lower part of said molding cavity.

To overcome gravity it is sufficient to use pumping means adapted to cause the molding material to flow without significantly pressurizing it.

Using this method, it is advantageously possible to start polymerization immediately after filling, to the benefit of productivity, and as the molding material remains homogeneous during filling the optical lenses obtained are advantageously free of optical defects which may cause them to be rejected, which is beneficial to the overall cost.

In some embodiments described in U.S. Pat. No. 5,110,514, for specific reasons which constitute the subject matter of that patent, the mold is filled from the bottom, but this is not a mold for making an optical lens and comprising two molding shells disposed on edge.

In all cases where the mold is to produce an optical lens filling is traditionally from the top, whether the molding shells are disposed on edge or flat.

There is nothing in this U.S. patent to suggest filling from the bottom a mold for making an optical lens and including molding shells disposed on edge; indeed, the contrary is true.

The features and advantages of the invention will emerge from the following description given by way of example with reference to the appended diagrammatic drawings.

DETAILED DESCRIPTION OF THE PREFERRED EMBODIMENTS

Referring to the figures, the overall object is to fill a mold 10 for making an optical lens, for example an ophthalmic lens. The mold 10 is formed by two molding shells 11A, 11B disposed on edge and an annular closure member 12 at the periphery of the shells, defining with them the required molding cavity 13.

In the embodiment shown it is assumed that the molding shells 11A, 11B are made of glass.

The molding shells 11A, 11B in practice have a generally circular outside contour, but this is not necessarily always the case.

Their facing inside surfaces are a negative image of the required surfaces of the optical lens to be molded.

These surfaces are coaxial in practice, with a common axis A.

With the molding shells 11A, 11B disposed on edge, the axis A is substantially horizontal and the molding shells 11A, 11B are substantially vertical.

Figure 1:
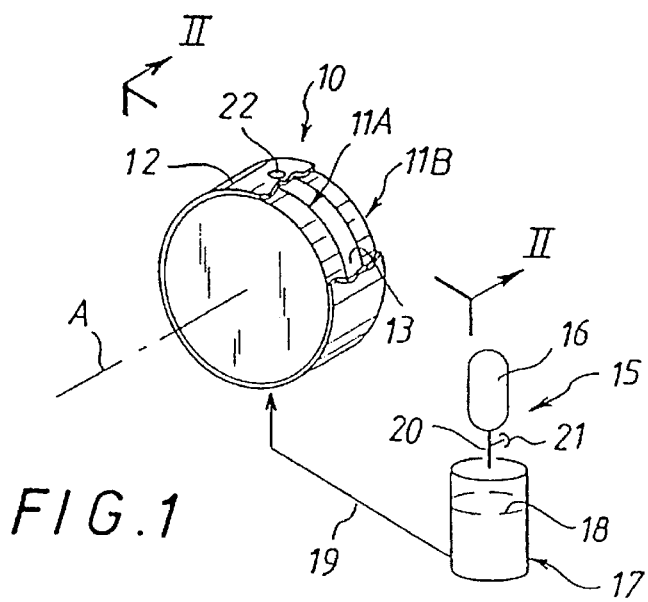
FIG. 1 is a locally cut away perspective view showing filling from the bottom in accordance with the invention of a mold for making an optical lens.
Figure 2:
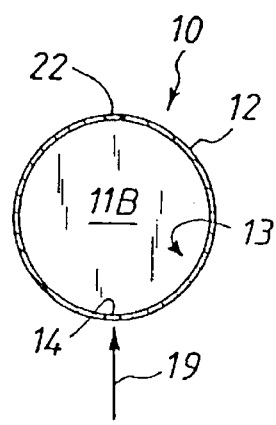
FIG. 2 is a view of this mold in transverse section on the line II—II in FIG. 1.

In the embodiment shown in FIGS. 1 and 2 the closure member 12 is a sleeve around the molding shells 11A, 11B and engaged with their edge.

The sleeve can be formed from a strip which is wound around the edge of the molding shells 11A, 11B.

This strip can be an adhesive synthetic material or a heat-shrink synthetic material.

A casting opening 14 in the closure member 12 is provided for introducing the molding material into the molding cavity 13.

This is just a hole in practice.

In accordance with the invention, the casting opening 14 is in the lower part of the molding cavity 13, preferably at its lowest point.

Pumping means 15 are used to fill the molding cavity 13.

The pumping means 15 are preferably such that the molding cavity 13 is fed continuously with molding material.

By continuous feeding here is meant totally smooth feeding.

In the embodiment of the invention shown in FIGS. 1 and 2 the pumping means 15 include a pressure source 16 on the upstream side of a storage vessel 17 containing the molding material 18 and which can be connected by a pipe 19 which can be applied, like a filling nozzle, to the casting opening 14 of the molding cavity 13.

The pressure source 16 is a compressed air vessel, for example, connected to the storage vessel 17 by a pipe 20 controlled by a valve 21. Its entry into the storage vessel 17 is above the level of the molding material 18 contained therein.

The valve 21 is simply opened to a greater or lesser degree to obtain the required flowrate for the molding material 18 and to fill the molding cavity 13 and therefore the mold 10 progressively from the bottom.

A vent 22 is preferably provided in the upper part of the molding cavity 13, at its highest point, for example.

The molding material 18 can be a substance which is at least partly polymerizable by exposure, for example by exposure to ultraviolet radiation, or a substance at least partially polymerizable by heat, or a substance which is polymerizable by exposure and by heat.

Figure 3:
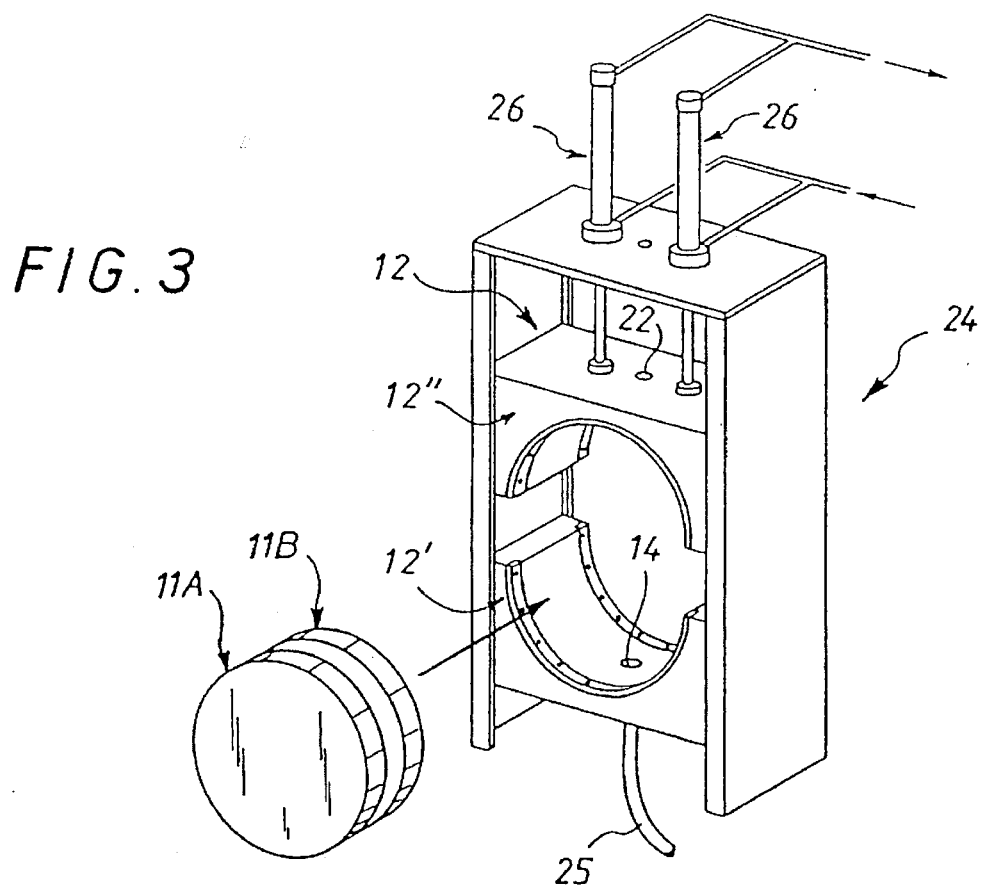
FIG. 3 is a perspective view showing another embodiment of the invention.

In the embodiment shown in FIG. 3 the closure member 12 is formed of two jaws 12', 12" carried by a frame 24 and adapted to enclose the edge of the molding shells 11A, 11B, each having to this end a semicircular interior contour; at least one of them is mobile to enable insertion of the molding shells 11A, 11B between them.

For example, the bottom jaw 12' is fixed and includes the casting opening 14 to which a pipe 25 is connected.

The top jaw 12" is mobile, sliding in the frame 24 and moved by rams 26, and incorporates the vent 22.

These provisions are not in themselves any part of the present invention and they will not be described in more detail here.

As an alternative to the above, the closure member 12 can be a standard type seal, i.e. a seal in which the molding shells 11A, 11B are nested.

The closure member 12 can instead be at least in part in one piece with one or both molding shell(s) 11A, 11B, as in some of the embodiments described in U.S. Pat. No. 5,110,514, for example.

The present invention is not limited to the embodiments described and shown, but encompasses any variant execution thereof and/or any combination of their component parts.

There is claimed:

1. Method for molding an optical lens comprising the steps of:

providing a mold including two molding shells disposed on edge and substantially vertically oriented, and an annular closure member disposed at the periphery of the molding shells thereby defining a molding cavity, a casting opening disposed in a lower portion of the mold and communicating with the molding cavity; introducing molding material into the molding cavity through the casting opening located in the lower part of the mold; exposing the molding material to ultraviolet radiation for at least initial partial polymerization less than two hours after the mold is filled; and removing the resulting optical lens from the molding cavity.

2. Method according to claim 1 wherein the casting opening is located at the lowest point of the molding cavity.

3. Method according to claim 1 wherein the molding material is pumped into the molding cavity through the casting opening.

4. Method according to claim 3 wherein the molding material is fed continuously into the molding cavity through the casting opening.

5. Method according to claim 4 wherein a pressure source is connected to an upstream side of a storage vessel containing the molding material for pumping the same into the molding cavity.

6. Method according to claim 1 wherein the molding material is exposed to radiation and heat in the molding cavity for further polymerization.

7. Method according to claim 1 wherein the closure member provided is in the form of a sleeve disposed around the molding shell.

8. Method according to claim 1 wherein the closure member includes two opposed jaws, at least one of the jaws being mobile between an open and a closed position for opening and closing the molding cavity.

9. Method according to claim 1 wherein the molding shells are sealingly nested in the closure member which defines a seal.

10. Method according to claim 1 wherein at least part of the closure member is formed in one piece with at least one of the molding shells.

* * * * *